Patented July 30, 1929.

1,722,761

UNITED STATES PATENT OFFICE.

WILLIAM B. NEWKIRK, OF RIVERSIDE, ILLINOIS, ASSIGNOR TO INTERNATIONAL PATENTS DEVELOPMENT COMPANY, OF WILMINGTON, DELAWARE, A CORPORATION OF DELAWARE.

MANUFACTURE OF DEXTROSE.

No Drawing. Application filed October 24, 1927. Serial No. 228,488.

The invention relates to the production of dextrose from starch, preferably maize starch, although other starches might be used, and provides a practical method whereby supersaturation of the converted liquor is maintained, so as to bring about crystallization, by continuous extraction of water, instead of by the method heretofore generally employed of decreasing the temperature of the solution.

The method of temperature reduction just referred to is disclosed in United States patents to W. B. Newkirk, No. 1,471,347, October 23, 1923, and 1,521,830, January 6, 1925, and 1,571,212, February 2, 1926.

The present invention, while providing an advantageous process for making hydrate dextrose, has special utility when used for the production of the anhydride because of the relatively high temperature at which the anhydride crystallizes which makes the old method by temperature drop hard to control. Moreover the crystal mass made by this process will contain more individual crystals (in distinction to twins and parallel growth aggregates, by which latter term is meant the growth of one crystal on the face of the other) than the hydrate product extensively produced by the method of temperature reduction referred to; as consequences of which the mother liquor is more easily extracted from the crystals in the centrifugal machine, less washing is necessary so that the erosion of the crystals and the loss of sugar in the wash water are diminished, and the finished product is purer, whiter, more uniform as to size and shape of the crystals and has a finer lustre and pours more easily than the previously produced hydrate. For similar reasons, and because the crystallization can be brought about wholly, or in large measure at least in the vacuum pan, the process requires less equipment than the processes heretofore used.

It has been the general practice for many years in the cane sugar industry to crystallize or "grain" in the vacuum pan in which the liquor is concentrated or "boiled". This practice has not been considered adaptable to the crystallization of dextrose from starch converted solutions because of the apparent impossibility of producing a magma of crystals and mother liquor from which the mother liquor could be extracted completely. The efforts to crystallize dextrose ever since the discovery of Kirchoff in 1812 have, generally speaking, followed lines of procedure quite different from those used for sucrose. That is, as stated, the practice has been to maintain supersaturation by lowering the temperature of the solution.

I have discovered, however, that if certain facts, which have not heretofore been fully recognized, or the bearing of which on this subject has not been clearly understood, are taken into consideration, a dextrose solution of proper character may be successfully "grained in the pan", that is crystallized, by extraction of water without substantial decrease of temperature. The sucrose practice must be modified, however, in certain important respects because of the very different characters of dextrose and sucrose solutions and the very different crystal habits of these sugars. The crystallization of dextrose is to a very marked extent exothermic; while the crystallization of sucrose is so slightly exothermic that this factor need not be and has not in fact been considered in practice. In a dextrose solution, there are, it is believed, five isomeric forms of dextrose, namely: alpha anhydrous, alpha hydrate, the specific rotation of both of which is 113° plus (Armstrong—The Carbohydrates and the Glucosides, 4th edition, London, 1924, page 52); beta anhydrous and beta hydrate, the specific rotation of which is from 16° plus to 20° plus (C. S. Hudson says 19° plus); and a dextrose heretofore known as gamma which is, apparently, a transition product between the alpha and beta forms. The alpha hydrate and anhydrous, the common commercial dextroses, and the beta anhydrous are the only forms, apparently, which can be crystallized.

These five isomerides (there may be more) when in solution tend to reach an equilibrium, whether the solution consists originally of one form or all forms in varying quantities, and the equilibrium mixture has a specific rotation of 52° plus. One form, when in excess, changes into the other forms, the process being reversible and depending upon the quantitative relations between the different forms. The phenomenon is due to mass action and may be described as tautomerism. The change apparently is from the alpha anhydrous, through the alpha hydrate, to the so-called gamma or transition form and then through the beta hydrate to the beta anhydrous, or in the reverse order from beta anhydrous to alpha anhydrous. That is to say transition from one anhydrous form to the other involves adding water to and then eliminating it from the molecule. Moreover, these tautomeric changes are not instantaneous but require more or less time, depending on the presence of impurities and other conditions. The recognition of this time factor is of prime importance in the success of the operation when one attempts to crystallize dextrose by boiling in the pan. The crystallized alpha hydrate has pseudo-morphic forms, of small or flake-like or blade-like structure, as well as the tablet form of crystals which may be considered normal. The pseudo-morphic forms must be excluded if the magma is to be purgible since they break down under the forces developed in the centrifugal machine. The alpha anhydrous normally crystallizes as well developed prisms but with a tendency under certain conditions to twinning and parallel growths. This tendency must be prevented or limited in order to obtain a product having the most desirable characteristics. The beta anhydrous tends to crystallize as prisms somewhat like the alpha anhydrous but slightly more elongated. It has a tendency to form twins and parallel growths, and also crystallize in forms which, though of sufficient size in three dimensions to purge, are deficient in their facial development so that they lack some of the brilliancy of the normal crystals. Crystallization takes place, on supersaturation, in one crystal type exclusively, when the solution is strongly unbalanced in favor of that type; but if conditions are not distinctly favorable to one type throughout the crystallizing operation the other crystallizable types may be produced. That is, if the solution, for example, is first unbalanced toward the alpha anhydrous and then toward the alpha hydrate, as may occur, in the former processes, because of too slow a lowering of temperature into the hydrate range, both types of crystals will be formed, and, for the reasons stated, the massecuite will not be purgible, or at least not completely purgible. The same result follows if the supersaturation is so great that both isomers are in a state of supersaturation. The factors bringing about disturbance in equilibrium as between the different dextrose forms in the solution,—these forms involving change in molecular structure, no doubt—are several, and such factors under ordinary conditions will not remain constant throughout the crystallizing operation. Thus the removal from solution by crystallization of dextrose of one form not only changes the balance between the solid and the liquid phases but disturbs the equlibrium as between the different dextrose isomerides in the mother liquor and also the proportion as between impurities and dextrose in solution. The effect on crystallization of all of these changes must be taken into consideration. For instance, the presence in the solution of solid phase of one type, will tend to unbalance the solution in the direction favorable to the formation of crystals of that particular type. Supersaturation at relatively high temperatures favors crystallization as alpha or beta anhydrous, the beta crystallizing out first at the higher temperature. Supersaturation at low temperatures favors crystallization as alpha hydrate. The quantity and character of the impurities also affects the type of crystals produced, an impure solution tending to bring about crystallization as hydrate and a very pure solution tending to crystallize as anhydride. The viscosity of the solution, while not directly affecting crystal type, does so indirectly since it slows down the crystallizing action, and is itself a variable factor, both initially in the converted solution and also as the solution is depleted of its dissolved dextrose. Its influence, therefore, will be different at one stage of the crystallizing operation than at another.

The difficulties attending the maintenance of conditions favorable to the production of one crystal type to the substantial exclusion of others—this being necessary, as stated, for obtaining a completely purgible magma, and a growth of crystals having the desired characteristics—are due, therefore, to factors not present in the crystallization of cane or beet sugar, namely: the exothermic character of the reaction; the fact that the dextrose solution is a mixture of isomerides (E. F. Armstrong "Carbohydrates and Glucosides" 4th edition compare, pages 39 and 121) which tend to crystallize under specifically different conditions; the fact that the transitions from one isomeride to the other are not accomplished instantaneously but require appreciable periods of time; and the influence of the impurities which is an ordinary starch converted solution are present in relatively large quantities and are of a highly complex and variable character and effect not only viscosity and supersaturation, but also the time required for the tautomeric changes necessary if one isomer only is to be crystallized.

It has been found, however, that it is possible, (in spite of the settled belief to the contrary as evidenced by a voluminous literature on the subject) to manufacture crystalline dextrose on a commercial scale by a method of graining in the pan, that is by the method of maintaining supersaturation by extraction of moisture without substantial change in temperature; and that furthermore, the product so made will have characteristics which make it superior to crystalline dextroses heretofore produced by method of temperature reduction. This new method, as applied to the manufacture of the anhydrides, alpha and beta, and also of the alpha hydrate will now be described.

*Production of the anhydrides.*—Preferably a solution is used having a substantially higher purity than that of the ordinary starch converted dextrose solution which contains about 89% to 90% dextrose on the basis of dry substances. It has been found that a crystalline dextrose having all of the desired characteristics above noted can be obtained readily from a solution of 94% purity or higher. Lower purity solutions than this can be used but will necessitate increased care and supervision in the operation of the process. A solution of the relatively high purity required may be had by crystallizing according to any known methods (such as those described in the patents noted), but since 100% purity is not aimed at, less care need be taken in crystallizing and the purged massecuite will not have to be washed with water. The sugar thus produced is melted with water and introduced, with or without filtration, into a vacuum pan at any suitable density, say 30° Baumé, and there concentrated to supersaturation. This will take place when the liquor has been brought to a gravity of 40° to 49° Baumé at temperatures from 113° to 140° F. The particular gravity will depend on temperature. Under certain conditions, as hereinafter set forth, the temperature may be below 113° F. and under other conditions it may be considerable above 140° F. If above 140° F. care must be taken to prevent caramelization of the sugar. At this stage the solution will be slightly supersaturated but insufficiently to produce crystallization to any extent at least. For the beta anhydrous the temperature should be at the upper end of the indicated range; for the alpha hydrate at the lower end of the range, preferably at 113° F. and for the alpha anhydride intermediate points, say from 122° to 128° F. although a variation upward to 140° F. and downward to 113° are possible under conditions to be defined. The liquor is then seeded with dry crystals or foots (crystals and mother liquor) of crystal type corresponding to the isomer to be crystallized, an in an amount varying with the character and amount of the impurities. Specifically for the alpha anhydride one may seed at 128° F., with the liquor at a gravity of 45° Baumé, (assuming an initial solution of 94% purity and of average character with respect to the nature of the impurities) using one-half of 1% of seed (dry basis) which will be ample. If the purity is as high as or higher than 97%, the seed may be merely a trace or no seed need be used. With such high purities the temperatures at seeding may be lower than 128° F., say 122° F., with a correspondingly reduced gravity, say 43° Baumé. The temperature may be as low as 113° F. if the purity is 100%. If the concentration and impurities are such as to give the solution a high viscosity the amount of seed should be increased. A liquor of 90% purity and with a gravity of 48° Baumé will grain if seeded at 140° F. In such case the amount of seed should be increased to say 1½% to 2%. Seeding which is used in the cane industry only to hasten crystallization is necessary with dextrose to induce crystallization of the right type unless the solution be of exceptionally high purity. New crystals of the proper kind will now begin to be formed provided first that crystallization is not prevented by the too rapid application of heat, since relatively large amounts of heat are liberated by the crystallization itself; second, that the impurities have not raised the solubility of the particular isomer being produced to such a point that the solution is insufficiently supersaturated; and third, that the viscosity is not high enough to prevent free movement of seed and induced crystals through the liquor. If the supersaturation is inadequate or the viscosity too high induction of new crystals can be aided by increasing the amount of seed introduced, or by promoting a greater circulation, through agitating with stirring devices or by the introduction of air or water or other suitable means. Too high concentration must be avoided in order that the supersaturation of the other isomers in the solution shall not be sufficient to bring about their crystallization. That is, each crystallizable isomer has a velocity of crystallization which will vary in accordance with purity of the solution, temperature and other conditions. When the conditions favor crystallization of one isomer the others, according to the phenomenon of tautomerism will change into the form which is crystallizing, so as to maintain equilibrium, unless supersaturation is so great that these other forms are forced to pass into the solid phase. A considerably larger number of crystals, at least two or three times as many, should be induced than with sucrose in order that, because of the slower velocity of crystallization, the boiling time may be kept within economically feasible limits. This means that the number of crystals in the finished batch will be greater and their size smaller than with sucrose. When a sufficient body of crystals of the desired crystal type has been induced, further induction of crystals is stopped preferably by the introduction of fresh liquor which reduces boiling and supersaturation, and the boiling is continued rapidly enough to insure circulation but not more rapidly than the dextrose coming out of solution will deposit on the body of crystals present, the temperature and gravity being maintained but at somewhat reduced levels. For example, the temperature may be 120° F. or lower and the gravity 42° Baumé or lower. If crystallization is so slow that gravity increases markedly water may be added to diminish density. For this stage of the operation, in which the already formed crystals are built up to the size desired, preferably without the induction of new crystals, the following conditions should be maintained: The evaporation must proceed much more slowly than with sucrose since the velocity of crystallization of dextrose is naturally slower than that of sucrose and is further decreased because it is dependent upon tautomeric change that must take place before crystallization can be continued; the massecuite should be as fluent as possible, more so than is customary with cane sugar solutions because viscosity is a greater deterrent to crystallization in the case of dextrose, and also so that the crystals will circulate and develop uniformly, otherwise they will grow together or may elongate abnormally. If the massecuite is too thick, it may be diluted with water, or higher temperatures may be temporarily applied by increase of pressure in the pan. Fresh liquor is added throughout this stage of the operation until the required volume of massecuite is obtained. As the solid phase increases less regard may be had for these conditions, since the presence of large quantities of solid phase of one crystal type strongly induces crystallization of the corresponding isomer and inhibits crystallization of the other isomers, even though other conditions might in themselves have just the opposite influence. Therefore as this stage of the operation proceeds the boiling may be more rapid and the concentrations of the mother liquor and the maintenance of temperatures specifically favorable to crystallization of the alpha anhydride may be in some measure disregarded, although the concentration cannot ordinarily be carried as far as is customary with sucrose. This means that the vacuum may be increased if not already at the maximum for which the pan is designed. Also as the solid phase increases, liquors of lower purity than that of the liquor with which the pan was started may be introduced into the pan, although low purity is adverse to crystallization of the anhydride. At the end of the operation the gravity of the mother liquor will ordinarily be about 42° Baumé.

It will be seen that the process is carried out in three stages: First, the concentration of the solution which may be carried on to about the point of supersaturation at any temperature or rate of boiling, an operation which may take twenty minutes; second, the induction of crystals preferably initiated by seeding with already formed crystals in amounts depending on the purity of the solution and the crystal type desired, which operation will require ordinarily from a few minutes to three quarters of an hour, and should not even under the most adverse circumstances require more than two or three hours, the amount of crystals to be induced depending primarily on the quantity and character of the impurities present and on the particular crystal type desired, as above set forth, and also on the size of the crystals desired in the finished batch, although generally speaking the crystals will be considerably smaller than can be readily obtained from sucrose solutions; and third, the growth of the already formed crystals, which operation should be completed ordinarily in from four to eight hours, and should not require in any case more than ten to twelve hours. The entire process including concentration and crystallization, will ordinarily therefore require from six to eight hours, as against one and one-half to two hours in the sucrose process. Any attempt to unduly hasten crystallization will result in an unpurgible magma.

If due to the amount or character of the impurities the magma at the third stage of the operation has a high viscosity, or if the rate of crystallization is for any reason slow, the massecuite having a mother liquor with a gravity of 42° Baumé may be dropped into a crystallizer, at atmospheric pressure, as in the process involving temperature reduction disclosed in United States Letters Patent No. 1,471,347 and No. 1,521,180 above mentioned, and allowed to remain with agitation and proper diminution of temperature as disclosed in such patents until crystallization has been carried as far as possible.

Assuming that the graining has been done entirely in the pan (which is ordinarily feasible) after the crystals have been developed to the proper size (a matter than can be readily controlled with this process) the massecuite is discharged from the vacuum pan and centrifuged to extract mother liquor. For the reasons above stated, the time of centrifuging is materially decreased, in comparison with the time required by the process involving crystallizing by temperature reduction and the amount of washing with water in the centrifugals is diminished to an even greater extent. The diminished washing not only saves time and decreases the loss of sugar in the wash water, but minimizes erosion of the crystals and thereby results in greater brilliancy and increased capacity for pouring or running freely. The increased purity of the product enhances its sweetness, which is important since dextrose is by its nature less sweet than sucrose. The anhydrous product thus produced will remain dry in moist atmospheres. The product will ordinarily consist to the extent of 90% or more of individual crystals in the strict sense of the term, the balance being twins and aggregates of the unitary type involving parallel growths. There will not be to any substantial extent, any interlacing or intergrowing of the crystals in groups giving granules of the so-called "cauliflower type." The mass may contain some beta anhydrous if the temperatures are high, but the presence of this type of crystals does not appear to effect the purgibility of the massecuite to any large extent.

The following is a typical example of the method as now practiced:

(1) a mixed melt of dextrose made by melting some washed second surgars of 94% purity (made according to Patents Nos. 1,471,347 and 1,521,280), some off grade first sugars of 99% purity and some unwashed first sugars of 98% purity, the melt having a gravity of 30° Baumé and a purity of 97.5%, is filtered over activated vegetable carbon until almost white in color. This liquor is boiled in a vacuum pan under 27½ inches vacuum until the temperature of the boiling liquor has reached 125° F. and the gravity 44° Baumé.

(2) At this point the supersaturation will be sufficient so that the addition of 0.1% (by weight) of alpha anhydrous crystals will cause the induction of new crystals.

The application of heat is then reduced so as to maintain the temperature at 125° F. At most only a slow rise of temperature is permitted during the graining operation which now takes place. The gravity will remain at approximately 44° or may increase slightly. Air is introduced into the pan in amount sufficient to cause violent agitation, but not sufficient to substantially increase the pressure. The agitation produced by the introduction of air is to hasten the induction of crystals. The mass gradually assumes a milky appearance and crystals can be detected by a small magnifying glass. If due to improper filtration a sufficient number of crystals do not form within a few minutes, say five minutes, more heat is applied and the gravity slowly increased with accompanying rise of temperature. For example with poor liquors the temperature may increase to 129° F. and the gravity to 45° Baumé before a sufficient number of new crystals have been induced.

When the crystals have been induced in such quantity that under microscopic examination of the magma the voids between the crystals are less than the areas of the crystals this graining stage of the process is completed.

By one experienced in the operation the proper number of crystals may be determined by the milky appearance of the liquor.

(3) The introduction of air is now stopped, application of heat to the pan is increased to produce a definite boiling which, in the previous stage of the process, had been almost entirely suspended. Dextrose liquor at 97.5% purity and 30° Baumé is introduced until boiling temperature has been reduced to 117° F. and the density to 42° Baumé. This temperature and gravity are maintained by continued introduction of fresh liquor and by varying the application of heat, the boiling being allowed to progress only at such a rate as permits the tautomeric changes and the crystallization of the isomer required in quantities which will be substantially completely used in building up the already formed crystals. The amount of fresh liquor introduced is nine times the original batch. The application of heat and the rate of introduction of fresh liquor are dependent on observation from time to time by sampling the massecuite. At the expiration of six hours the batch is discharged from the pan and centrifuged and washed. The product is alpha anhydrous dextrose of substantially 100% purity, the impurities if present being too small to be detected quantitatively.

It will be understood that the above example is merely illustrative. Details of the operation will vary according to varying conditions as previously set forth.

*Production of beta anhydrous.* — The process is the same as that for production of the alpha anhydrous except that the temperature should be maintained at 140° F. or above, the mother liquor gravity should be about 45° Baumé, and the seed should be beta anhydrous. Mixtures of alpha and beta may be made, however, but the beta anhydrous is likely to be rather smaller and less perfectly developed, which is objectionable. If present in any large quantities, it makes the massecuite difficult to purge, although such massecuite can be purged much better than a mixture of anhydrous and hydrate crystals.

*Production of alpha hydrate.* — The conditions are the same as in the manufacture of the alpha anhydrous, except that the gravity of the solution should be less, preferably 40° to 42° Baumé, the crystallizing temperature lower, that is, approximately 120° F. or less, and the seed should be alpha hydrate of normal form to the exclusion of pseudo-morphs. The deposition of new sugar apparently has to proceed more slowly, otherwise the dextrose going out of solution tends to crystallize in imperfectly developed crystal forms.

This application is a continuation in part of my application, Serial No. 167,362, filed February 10, 1927.

I claim:

1. Method of producing a purgible mass of crystals in a starch converted dextrose solution which comprises keeping the solution at a crystallizing supersaturation by continued extraction of water therefrom.

2. Method of producing a purgible mass of crystals in a starch converted dextrose solution which comprises keeping the solution at a crystallizing supersaturation without substantial reduction in temperature by continued extraction of water therefrom.

3. Method of producing a purgible mass of crystals in a starch converted dextrose solution which comprises maintaining the solution at a temperature favorable to and extracting water therefrom at a rate which permits crystallization in substantial amount of one isomer only of the dextrose in solution.

4. Method of producing a purgible mass of crystals in a starch converted dextrose solution which comprises keeping the solution at a crystallizing supersaturation by continued extraction of water therefrom while maintaining in dispersion therein dextrose crystals of the type to be produced.

5. Method of producing a purgible mass of crystals in a starch converted dextrose solution which comprises maintaining the solution containing dispersed therein dextrose crystals of the type to be produced at a temperature favorable to the production of said type and keeping the solution at a crystallizing supersaturation by continued extraction of water therefrom.

6. Method of producing a purgible mass of dextrose crystals which comprises maintaining a starch converted dextrose solution having a dextrose content of substantially more than 90 per cent at a crystallizing supersaturation by continued extraction of water therefrom.

7. Method of producing a purgible mass of dextrose crystals which comprises maintaining a starch converted dextrose solution having a dextrose content of not substantially less than 97 per cent at a crystallizing supersaturation by the continued extraction of water therefrom.

8. Method of producing anhydrous crystalline dextrose which comprises maintaining a starch converted dextrose solution of a purity of substantially more than 90 per cent and containing anhydrous crystals dispersed therein at a temperature favorable to the crystallization of the anhydride and keeping the solution at a crystallizing supersaturation by extraction of water therefrom.

9. Method of producing anhydrous crystalline dextrose which comprises maintaining a starch converted dextrose solution having a purity of not substantially less than 97 per cent and containing anhydrous crystals dispersed therein at a temperature of substantially 117° F. to 125° F. and keeping the solution at a crystallizing supersaturation by continued extraction of water therefrom.

10. Method of obtaining crystalline dextrose from a starch converted dextrose solution which consists in concentrating the solution to approximately the point of supersaturation; boiling the solution under a vacuum to induce crystallization; and continuing the boiling in vacuo to maintain a crystallizing supersaturation.

11. Method of obtaining crystalline dextrose from a starch converted dextrose solution which consists in concentrating the solution to approximately the point of supersaturation; boiling the solution under a vacuum to induce crystallization; and continuing the boiling in vacuo, at a slightly reduced temperature to maintain a crystallizing supersaturation.

12. Method of obtaining crystalline dextrose from a starch converted dextrose solution which consists in concentrating the solution to approximately the point of supersaturation; introducing seed crystals; boiling the solution under a vacuum to induce crystallization; and continuing the boiling in vacuo to maintain a crystallizing supersaturation.

13. Method of obtaining crystalline dextrose from a starch converted dextrose solution which consists in concentrating the solution to approximately the point of supersaturation; boiling the solution under a vacuum at a temperature favorable to the induction of crystals of one crystal type only; and continuing the boiling in vacuo to maintain the crystallizing supersaturation.

14. Method of obtaining crystalline dextrose from a starch converted dextrose solution which consists in concentrating the solution to approximately the point of supersaturation; introducing seed crystals of the type of solid phase desired to be produced; boiling the solution under a vacuum at a temperature favorable to the induction of crystals of the type of the seed; and continuing the boiling in vacuo, at a temperature favorable to the same type of crystals, to maintain the solution at a crystallizing supersaturation.

15. Method of obtaining crystalline dextrose from a starch converted dextrose solution which consists in concentrating the solution to approximately the point of supersaturation; boiling the solution under a vacuum to induce crystallization; and continuing the boiling in vacuo to maintain a crystallizing supersaturation while adding fresh solution to the batch.

16. Method of obtaining crystalline dextrose from a starch converted dextrose solution which consists in concentrating the solution to approximately the point of supersaturation; boiling the solution under a vacuum to induce crystallization; and continuing the boiling in vacuo, but at an increased rate, to maintain a crystallizing supersaturation.

17. Method of obtaining crystalline dextrose from a starch converted dextrose solution which consists in concentrating the solution to approximately the point of supersaturation; boiling the solution under a vacuum while subjecting the solution to violent agitation to induce crystallization; and continuing the boiling in vacuo to maintain a crystallizing supersaturation.

18. Method of obtaining crystalline dextrose from a starch converted dextrose solution which consists in concentrating the solution to approximately the point of supersaturation; boiling the solution under a vacuum while agitating the solution by forcing air under pressure therethrough to induce crystallization; and continuing the boiling in vacuo to maintain a crystallizing supersaturation.

19. Method of obtaining crystalline dextrose from a starch converted dextrose solution which consists in concentrating the solution to approximately the point of supersaturation; boiling the solution under a vacuum while subjecting it to mechanical agitation to induce crystallization; and continuing the boiling in vacuo, at an increased rate but without the mechanical agitation, to maintain a crystallizing supersaturation.

20. Method of obtaining crystalline dextrose which comprises boiling under a vacuum a starch converted dextrose solution having a dextrose content of substantially more than 90 per cent to approximately the point of supersaturation; continuing the boiling in vacuo, while introducing fresh liquor, at a rate permitting tautomeric change in the solution and crystallization, in substantial quantity, only of the isomer corresponding to the solid phase present and in amount not substantially in excess of that which will build upon such solid phase.

21. Method of obtaining crystalline dextrose which comprises boiling under vacuum a starch converted dextrose solution, having a dextrose content of substantially more than 90 per cent, to approximately the point of supersaturation; continuing the boiling in vacuo but with reduced application of heat while subjecting the solution to agitation to induce a body of crystals; continuing the boiling in vacuo with increased application of heat at a rate permitting tautomeric change in the solution and crystallization, in substantial amount, only of the isomer corresponding to the crystal form of the solid phase present and in amount not substantially in excess of that which will build upon the already formed solid phase.

22. Method of producing a purgible mass of crystals in a starch converted dextrose solution which comprises maintaining the solution at a temperature, and by extraction of water therefrom, at a degree of supersaturation which will permit crystallization in substantial amount of only one isomeric form of the dextrose in solution.

23. Method of producing a purgible mass of crystals in a starch converted dextrose solution which consists in maintaining a solution containing dispersed therein solid phase of one crystal type only, at a temperature, and by extraction of water therefrom, at a degree of supersaturation which will permit crystallization, in substantial amount, only of the isomeric form corresponding to that of the solid phase present and in quantity not substantially in excess of that which will build upon the solid phase present.

24. Method of producing cyrstalline dextrose which comprises boiling a starch converted dextrose solution having a purity of substantially more than 90 per cent until such solution is brought to a gravity of from 40° Baumé to 49° Baumé and to a temperature of from 113° F. to 140° F.; seeding the solution with crystals of the type to be produced; continuing the boiling in vacuo at a temperature within the aforesaid temperature range; and then continuing the boiling in vacuo, while adding fresh liquor, at a rate producing crystallization in an amount not substantially in excess of that which will build upon the already produced crystals.

25. Method of producing anhydrous crystalline dextrose which comprises boiling under vacuum a starch converted solution having a purity substantially in excess of 90 per cent until the solution reaches a gravity of from 44° to 49° Baumé and a temperature of from 122° F. to 128° F.; continuing the boiling in vacuo at temperatures within the above specified range and agitating the solution to induce crystallization as anhydride; and continuing the boiling in vacuo, while adding fresh solution, at a rate which brings about crystallization as anhydride in amount not substantially in excess of that which will build upon the already formed crystals.

26. Method of producing anhydrous crystalline dextrose which comprises boiling a starch converted dextrose solution having a purity of approximately 97 per cent to a gravity of approximately 44° Baumé and a temperature of 125° F.; introducing anhydrous seed crystals into the solution and continuing the application of heat to maintain a temperature of approximately 125° F. while introducing air through liquor to produce agitation; then stopping the introduction of air while increasing the application of heat and at intervals introducing fresh liquor in aggregate amount approximately nine times the original batch, thereby maintaining the solution at a temperature of approximately 117° F. until the crystallizing operation is completed.

27. Method of obtaining crystalline dextrose from a starch converted dextrose solution which consists in concentrating the solution to approximately the point of supersaturation; boiling the solution under a vacuum to induce crystallization; and continuing the boiling in vacuo to maintain a crystallizing supersaturation while adding fresh liquor of lower purity than the original batch.

28. Method of obtaining crystalline dextrose from a starch converted dextrose solution which consists in concentrating the solution to approximately the point of supersaturation; boiling the solution under a vacuum to induce crystallization; and completing the crystallization under atmospheric pressure by reduction of temperature.

29. Method of obtaining crystalline dextrose from a starch converted dextrose solution which consists in concentrating the solution to approximately the point of supersaturation; boiling the solution under a vacuum to induce crystallization; and continuing the boiling in vacuo to maintain a crystallizing supersaturation at a reduced temperature and gravity of the solution.

WILLIAM B. NEWKIRK.